United States Patent [19]
Coffinberry et al.

[11] Patent Number: 5,923,944
[45] Date of Patent: Jul. 13, 1999

[54] FLUID CONTAINMENT ARTICLE FOR HOT HYDROCARBON FLUID AND METHOD OF FORMING A COATING THEREON

[75] Inventors: George A. Coffinberry, West Chester; Kevin R. Leamy, Loveland; Frederick J. Sellers, Cincinnati, all of Ohio; John F. Ackerman, Cheyenne, Wyo.

[73] Assignee: General Electric Company, Cincinnati, Ohio

[21] Appl. No.: 08/731,540

[22] Filed: Oct. 16, 1996

Related U.S. Application Data

[60] Provisional application No. 60/005,780, Oct. 20, 1995.

[51] Int. Cl.$^6$ ....................................................... B22F 3/00
[52] U.S. Cl. .......................... 428/551; 428/552; 428/553; 428/565; 427/248.1; 427/126.3; 427/255; 123/668; 208/48 R; 585/950
[58] Field of Search .............................. 427/126.3, 248.1, 427/255; 431/3; 123/668, 670; 428/548, 551, 552, 553, 565, 469, 148, 156; 203/7, 8, 9; 208/48 R; 422/241, 312; 585/950

[56] References Cited

U.S. PATENT DOCUMENTS

| | | | |
|---|---|---|---|
| 1,869,077 | 7/1932 | Prentice | 123/668 |
| 2,044,416 | 6/1936 | Atwell | 202/36 |
| 3,475,192 | 10/1969 | Langley | 117/33.3 |
| 3,692,696 | 9/1972 | Kravitz et al. | 252/439 |
| 3,827,967 | 8/1974 | Nap et al. | 208/48 R |
| 4,277,525 | 7/1981 | Nakayama et al. | 427/387 |
| 4,297,150 | 10/1981 | Foster et al. | 148/6.3 |
| 4,454,021 | 6/1984 | Watanabe et al. | 208/48 R |
| 4,529,626 | 7/1985 | Baker et al. | 427/226 |
| 4,530,340 | 7/1985 | Totman | 123/669 |
| 4,692,313 | 9/1987 | Watanabe et al. | 422/241 |
| 4,942,732 | 7/1990 | Priceman | 60/261 |
| 4,972,811 | 11/1990 | Baresel et al. | 123/143 B |
| 5,169,515 | 12/1992 | Ngan et al. | 208/48 R |
| 5,242,574 | 9/1993 | Broutin et al. | 208/48 R |
| 5,264,244 | 11/1993 | Edwards, III | 427/226 |
| 5,266,360 | 11/1993 | Edwards, III | 427/397.7 |
| 5,269,137 | 12/1993 | Edwards, III | 60/261 |
| 5,805,973 | 9/1998 | Coffinberry et al. | 428/551 |

FOREIGN PATENT DOCUMENTS

| | | |
|---|---|---|
| 2662704 | 12/1991 | France . |
| 3928480 | 4/1990 | Germany . |
| 61-178514 | 8/1986 | Japan . |

*Primary Examiner*—Kathryn Gorgos
*Assistant Examiner*—Wesley A. Nicolas
*Attorney, Agent, or Firm*—Andrew C. Hess; David L. Narciso

[57] ABSTRACT

A fluid containment article that exhibits a reduced tendency for thermal decomposition products to deposit and adhere to its surface in contact with a hydrocarbon fluid, such as a hydrocarbon fuel, at elevated temperatures. Deposition and adhesion of thermal decomposition products are avoided by tailoring both the composition and surface finish of the surface contacting the hydrocarbon fluid. Preferred characteristics are achieved by appropriately preparing the surface of the article to have a surface roughness characterized by an $R_{max}$ of up to about 0.4 micrometer, and then depositing an oxide coating on the surface using a deposition process that yields a coating consisting essentially of a metal oxide and the vapors of an organometallic compound used in the deposition process. The oxide coating is directly deposited on the surface of the article, and therefore does not employ an adhesion-promoting layer of the type conventionally used by the prior art to promote adhesion of a metal oxide layer on a metal substrate.

5 Claims, 2 Drawing Sheets

FLUID CONTAINMENT ARTICLE FOR HOT HYDROCARBON FLUID AND METHOD OF FORMING A COATING THEREON

CROSS REFERENCE TO RELATED APPLICATIONS

This application claims the benefit of U.S. Provisional Application No. 60/005,780, filed Oct. 20, 1995. In addition, this application is related to U.S. patent application Ser. Nos. 08/592,244 filed Jan. 26, 1996, now U.S. Pat. No. 5,803,973 and 08/819,015, filed Mar. 17, 1997, still pending, which is a continuation of 08/592,248, filed Jan. 26, 1996, now abandoned the contents of which are incorporated herein by reference.

BACKGROUND OF THE INVENTION

1. Field of the Invention

This invention relates to articles that form flow passages or otherwise contain hydrocarbon fluids at high temperatures. More particularly, this invention is directed to a surface coating for such an article and a method for forming the coating, wherein the coating inhibits the deposition and adhesion of hydrocarbon fluid thermal decomposition products, such as gum, coke, sulfur compounds and other impurities, on the article.

2. Description of the Prior Art

As is known in the art, hydrocarbon fluids are prone to the formation of thermal decomposition products at elevated temperatures. In the form of deposits, such decomposition products can foul heat exchangers, plug fuel injectors and lubrication distribution jets, jam control valves and cause problems with many other types of operating and control devices through which the hydrocarbon fluid flows.

The formation of hydrocarbon decomposition products is generally referred to as thermal instability or, in the case of hydrocarbon fuels, fuel instability. The mechanisms for formation of deposits from thermal instability have been studied and documented. In the case of fuels, it is generally accepted that there are two distinct mechanisms occurring at two temperature levels. In the first mechanism, referred to as the coking process, as temperature increases from room temperature, there is generally a consistent increase in the rate of formation of coke deposits up to about 675° C. (about 1250° F.), at which high levels of hydrocarbon pyrolysis lead to coke formation and eventually limit the usefulness of the fuel. A second lower temperature mechanism generally peaks at about 370° C. (about 700° F.) and involves the formation of gum deposits. This second mechanism generally involves oxidation reactions, leading to polymerization that includes the formation of gums. Coke and gum formation and deposition can occur simultaneously in the mid-temperature region.

Coke formation in hydrocarbons is discussed in U.S. Pat. No. 2,698,512, and heat stability of jet fuel and the consequences of thermal degradation of the fuel are discussed in U.S. Pat. No. 2,959,915, both patents being incorporated herein by reference. These patents suggest specific formulations which place limitations on the fuel chemistry and impurities associated with hydrocarbon fuels, so that the fuels will be usable at high temperatures without the typical formation of gums and coke. Gum and coke formation are also discussed in U.S. Pat. No. 3,173,247 to Smith et al., incorporated herein by reference. Smith et al. note that heat must be transferred from the engine to some part of the aircraft and/or its load when an aircraft is operated at very high flight speeds. Smith et al. further note that, though the fuel on the aircraft could serve to receive this heat, to do so is unfeasible because jet fuels are not stable at the high temperatures that are developed at multi-Mach speeds, but instead decompose to produce intolerable amounts of insoluble gum or other deposits, such as coke. As with the previously referenced patents, the solution proposed by Smith et al. is to place limitations on fuel chemistry and impurities associated with the fuel.

Even with the most elaborate special treatment of the fuel, coke formation cannot be entirely eliminated even when a pure hydrocarbon is used because coke formation will always occur given a sufficient temperature and duration. On the other hand, the chemistry of the hydrocarbon fluid mixture and the chemistry of the vessel used to contain the fluid can have a major influence on deposit mechanisms and deposit rates at the temperatures where it is most desirable to use the fluid. In the lower temperature region where gum formation occurs, oxygen from air dissolved in the liquid is the major adverse ingredient. Boiling amplifies this adversity because of the oxygen concentration effect of gas bubbles adjacent to hot walls. If oxygen or air is absent, gum formation is less likely to occur.

In much of the prior art, the problems associated with gum and coke thermal deposits have predominately dealt with bulk fluid chemistry and reactions that may take place within the fluid. These investigations have involved a wide range of hydrocarbon compositions and the presence of numerous impurities such as sulfur compounds, nitrogen compounds, oxygen and trace metals. It has been observed that deposits attached to the walls of the fluid vessel often contain very large quantities of sulfur compounds or intermediates thereof, in addition to gums and cokes. Little attention has, however, been given in the prior art to the role of the chemistry and reactions which directly take place between the vessel walls and the fluid. Even though wall reactions are not well understood, it has been proposed that fluid-wall deposit thickness reactions might be reduced if the wall were coated with some form of relatively inert material. For example, U.S. Pat. No. 4,297,150 to Foster et al. teaches a protective metal oxide film for metal surfaces that are susceptible to coking, corrosion and catalytic activity. As is conventional with metal oxide films, Foster et al. require that, prior to deposition of the oxide film by chemical vapor deposition (CVD) using a carrier gas, the metal surfaces must be oxidized in order to achieve an adherent and uniform film. Though Foster et al. do not disclose any other surface preparations, one skilled in the art would appreciate that efforts to reduce the surface roughness of the metal surface would be antithetical to the teachings of Foster et al., since the surface of the oxidized metal surface is intended to promote adhesion of the oxide film. Conventional surface finishes for promoting the adhesion of metal oxide films are generally on the order of at least about 4.0 micrometers (about 160 microinches) $R_a$, as evidenced by U.S. Pat. No. 4,942,732 to Priceman.

Thermal instability and fuel instability are becoming more significant with developing technology, and become even more significant as operating temperatures increase through advances in materials technology and as the chemical quality of hydrocarbons for fuels, oils, lubricants, petrochemical processes (plastics and synthetics) and the like, decreases. Furthermore, hydrocarbon fluids, fuels and oils derived from nonpetroleum sources, such as shale and coal, will have significantly more problems with thermal instability because of their high content of olefins, sulfur and other compounds.

Accordingly, it would be advantageous to provide fluid containment articles and processes for preventing the formation of adverse decomposition products and foulants in such applications where thermal instability, including fuel instability, is a problem as a result of exposure to such fluids to high temperatures. In particular, it would be desirable if such advancements were achieved with fuel containment articles for holding or otherwise containing the flow of a hot hydrocarbon fluid, including heat exchangers that use a hydrocarbon fuel as the coolant and fuel nozzles that deliver a hot hydrocarbon fuel to a gas turbine engine combustor where the fuel is burned, so as to prevent or significantly reduce the tendency for insoluble gums, coke, sulfur compounds or mixtures thereof to deposit and adhere to surfaces of the article. Such capabilities would preferably be achieved without altering the hydrocarbon chemistry, maintaining strict control of impurities and/or providing additives and special processing such as passivation treatments, because such techniques constrain the use of the fluid, increase cost and promote uncertainty as to the quality level of the fuel or treatment at a particular time.

SUMMARY OF THE INVENTION

It is an object of this invention to provide an article that forms a flow passage or otherwise contains a hydrocarbon fluid at high temperatures, and whose surfaces in contact with the fluid inhibit the deposition and adhesion of thermal decomposition products, such as gum, coke, sulfur compounds and other impurities, of the fluid.

It is another object of this invention that such an article has a coating on its surfaces, wherein the coating inhibits the deposition and adhesion of thermal decomposition products.

It is a further object of this invention to provide a method for depositing the coating so as to promote the ability of the coating to eliminate or reduce the deposition and adhesion of thermal decomposition products on the surfaces of the article.

It is still a further object of this invention that the coating is suited for use with ordinary lowcost fuels, oils and other hydrocarbons.

According to this invention, there is provided a fluid containment article that exhibits a reduced tendency for thermal decomposition products to deposit and adhere to its surfaces when in contact with a hydrocarbon fluid, such as a hydrocarbon fuel. In addition, this invention pertains to a coating for the surfaces of such an article, and to a method for depositing the coating on the surfaces of the article. The teachings of this invention are applicable to a multitude of processes, systems and devices, including petrochemical processes, machine tools, automobile engines, aircraft gas turbine engines, and marine and industrial engines in which surface deposits from hydrocarbon fluids, fuels and oils are a major problem. As used herein, the term "deposits" includes gum, coke, sulfur compounds and other decomposition impurities that may form as a result of the thermal instability of a hydrocarbon fluid. Such deposits may include metal-nitrogen compounds, metal-oxygen compounds, various olefins and/or polymers formed therefrom, saturated and unsaturated polymers, cyclic and aromatic hydrocarbon compounds and the like. Those deposits noted as "decomposition impurities" are frequently dependent on the initial fuel content, including the starting impurities therein.

According to this invention, the coating may be termed a liner, liner material, diffusion barrier or diffusion barrier material on the surface of any type of fluid containment article, including vessels, tanks and articles that form flow passages. Thus, for example, the present invention is applicable to heat exchangers for dissipating heat generated by combustion, by which a hydrocarbon fuel can be used as the coolant without the undesirable deposition of thermal decomposition products on the walls of the heat exchanger through which the fuel flows. In view of the mechanisms by which thermal decomposition products form, the teachings of this invention are most applicable to articles that contain or otherwise contact a hydrocarbon fluid at a temperature at which hydrocarbon gum and coke deposits are likely to form, e.g., temperatures of up to at least 150° C.

To achieve the above, the composition and character of the coating are selected on the basis of its ability to inhibit the deposition and adhesion of thermal decomposition products of a hydrocarbon fluid on the coating surface. In addition, the process by which the coating is deposited is also tailored to inhibit the deposition and adhesion of such products. In this respect, the invention generally entails a metallic substrate that forms the surface of the containment article. According to this invention, the substrate has a surface roughness characterized by an $R_{max}$ of about 0.4 micrometer or less so as to yield a smooth finish, but is otherwise free of flaws. As used herein, the meanings of the terms "$R_{max}$" and "flaws" are in accordance with accepted industry standard terminology evidenced by ANSI standard B46.1, which standardizes $R_{max}$ as a specific peak-to-peak surface measurement, and qualifies "flaw" as surface irregularities other than those covered by "surface roughness" and "surface waviness."

The coating is directly deposited on this surface in the form of an oxide layer that conforms to the surface of the substrate. As used herein, the coating is a "conformal coating" in the sense that the oxide atoms of the coating follow the contour of the surface at a microscopic scale. So as to have a surface roughness similar to that of the substrate, the coating preferably has a thickness of not more than one micrometer, such that the coating will conform to and cover the surface of the article. A preferred deposition process is a chemical vapor deposition using an organometallic compound without use of a carrier gas, such that the coating consists essentially of the oxide and vapors of the organometallic compound.

Notably, the coating is deposited directly on the surface, and therefore without an adhesion- promoting layer of the type conventionally used by the prior art to promote adhesion of a metal oxide layer on a metal substrate. As such, the present invention is contrary to the teachings of Foster et al., which require that an oxide layer be grown in situ on the surface of the metal substrate prior to deposition of an oxide layer. Instead, this invention is directed to inhibiting the deposition and adhesion of thermal decomposition products by tailoring both the composition and surface finish of the surface contacting a hydrocarbon fluid at an elevated temperature. According to this invention, each of these characteristics is achieved by appropriately preparing the substrate surface, and by tailoring the deposition process to yield a coating that consists essentially of an oxide, the balance being vapors of the organometallic compound precursor used in the deposition process.

In view of the above, it is apparent that the material for the coating and the manner in which the coating is deposited serve to inhibit or prevent the deposition and adhesion of gum, coke, sulfur compounds, or other decomposition impurities or mixtures thereof formed by the thermal decomposition of the hydrocarbon fluid. As such, the present invention solves the problems related to the formation of gum, coke, sulfur and other deposit-forming reactions that are chemically associated with hot hydrocarbon fluid and surfaces that contact the fluid. In addition, the coating of this invention is also a physical diffusion barrier to the hot hydrocarbon fluid, in that the coating does not permit the diffusion of or passing of the fluid through the underlying substrate material of the fluid containment article.

Other objects and advantages of this invention will be better appreciated from the following detailed description.

BRIEF DESCRIPTION OF THE DRAWINGS

The above and other advantages of this invention will become more apparent from the following description taken in conjunction with the accompanying drawings, in which.

DETAILED DESCRIPTION OF THE INVENTION

This invention is directed to articles for containing hydrocarbon fluids or through which hydrocarbon fluids flow, all of which may be termed containment articles. Such articles may include tubular-type heat exchangers, high pressure turbine nozzles, fuel nozzles, tubing and control valves. In addition, the invention is applicable to any hydrocarbon fluid in which gum or other polymers, coke, sulfur compounds or any other decomposition impurities form when the fluid is exposed to heat. Although the invention is not directed to or limited by any particular hydrocarbon fluid or hydrocarbon fuel, typical fuels for which the containment articles of the present invention are adapted, and from which the containment articles are protected, are the hydrocarbon and distillate fuels, including hydrocarbon and distillation products thereof, which are generally liquid at room temperature. The fluids (liquids and/or gases) may be pure hydrocarbon or mixtures of hydrocarbons, distillation products, mixtures of such distillation products, mixtures of hydrocarbons and distillation products, No. 1 or No. 2 diesel fuels, natural gas, jet engine fuels such as Jet-A fuel, or the foregoing fuels mixed with additives which are well known in the prior art. Hydrocarbon fuels refer to the liquid fuels which are conventionally used in reaction motors, such as industrial gas turbines, engines used in jet propelled aircraft or any other gas turbine engine. Various hydrocarbon fuels that are particularly desirable for jet aircraft engines are described at column 6, lines 30–74 of U.S. Pat. No. 2,782, 592 and at column 2, lines 28 to column 3, line 23 of U.S. Pat. No. 2,959,915, both of which are incorporated by reference herein in their entirety.

Although all of the foregoing hydrocarbon fluids can be used in the present invention, and the advantages of the present invention apply thereto, it is an important advantage of the present invention that pure, untreated, lowcost hydrocarbon fluids can be used as fuel in jet engines without special handling, without further treatment, without costly quality control procedures, and without the need for special processing either prior to or subsequent to loading the fuel in the aircraft. Furthermore, these same advantages apply to all other processes and systems which utilize hydrocarbon fluids, such as those of the petrochemical and plastics industries, the synthetic fuels industry, commercial and home heating industries, and the like.

Figure 1:
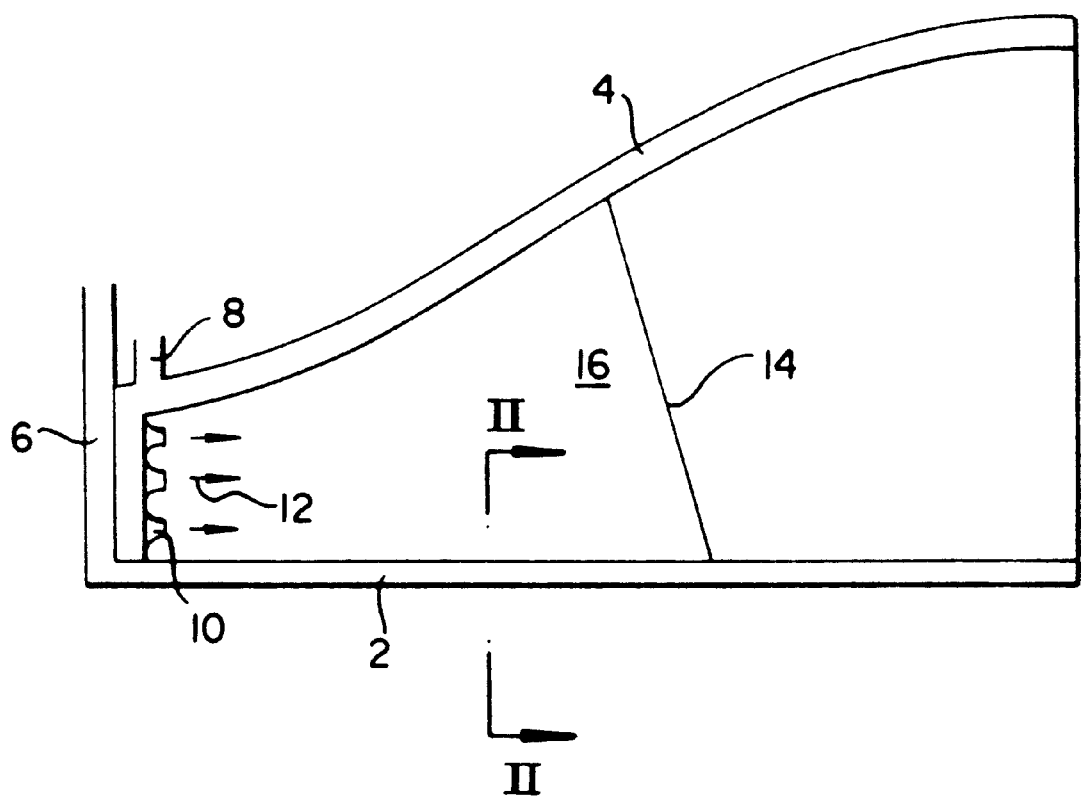
FIG. 1 is a partial longitudinal view of a high pressure turbine nozzle for a jet engine fueled by a hydrocarbon fuel and incorporating a heat exchanger wall in accordance with this invention.

The fluid containment article of the present invention may be any component that is adapted to contain a hydrocarbon fluid at an elevated temperature, particular those temperatures at which thermal decomposition products tend to form in such fluids while flowing through a flow passage. An example of such a containment article is shown in FIG. 1, which represents a heat exchanger 2 for cooling the high pressure turbine nozzle of a jet engine. The heat exchanger 2 serves to transfer heat generated within a combustion chamber 16 to a liquid hydrocarbon fuel confined in and transported through the heat exchanger 2 adjacent the combustion chamber.

In FIG. 1, liquid hydrocarbon fuel enters the high pressure turbine nozzle through a conduit 6, and thereafter flows through the heat exchanger 2 where heat is transferred from the combustion chamber 16 to the liquid hydrocarbon fuel passing through the heat exchanger 2. Liquid hydrocarbon fuel also flows through a passageway 4 where heat transfer also occurs between the chamber 16 and the fuel. Vaporized hydrocarbon gas 12 flows into the chamber 16 through a number of gas injection ports 10. Combustion of this gas 12 can result in an operating temperature for the combustion chamber 16 of about 650° C. (about 1200° F.), such that the fuel temperature within the heat exchanger 2 can be sufficiently high (e.g., 150° C. and higher) to cause the formation of thermal decomposition products in the fuel.

Figure 2:
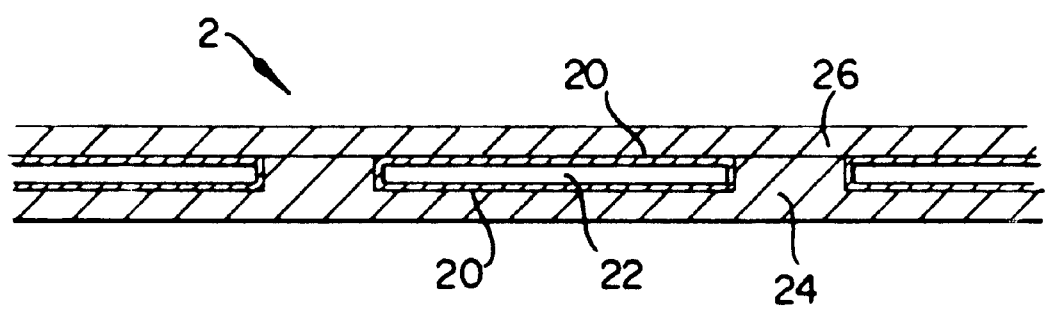
FIG. 2 is a sectional view taken along the line II—II of FIG. 1, and shows fuel containment passages for circulating the hydrocarbon fuel.

FIG. 2 shows in more detail the heat exchanger 2 of FIG. 1 through a cross-sectional view taken along line II—II of FIG. 1. As shown, the heat exchanger 2 includes walls 24 and 26 that form a number of fuel passageways 22. The walls 24 and 26 can generally be constructed of any suitable high-temperature material, such as a stainless steel, a corrosion-resistant alloy of nickel and chromium commercially available as INCONEL, a trademark of the International Nickel Company, Inc., a high-strength, nickel-base, corrosion-resistant alloy identified as HASTELLOY, a trademark of Union Carbide Corporation. Such materials appear to cause, promote or otherwise be susceptible to the formation of hydrocarbon thermal decomposition products of the types described previously.

As shown, the walls 24 and 26 have a coating 20 in accordance with the teachings of this invention. The surface of the coating 20 is adapted to contact the hydrocarbon fuel, such that the coating 20 serves to protect the underlying material of the walls 24 and 26. Accordingly, as the liquid hydrocarbon fuel passes through the passageway 22, it does not physically contact the substrate material of the walls 24 and 26. As such, the fuel cannot erode or react with the walls 24 and 26. For best results, the coating 20 is a continuous oxide layer that completely covers all surfaces of the passageway 22, such that heat transfer between the combustion chamber 16 and the hydrocarbon fuel occurs exclusively through the coating 20.

In accordance with the present invention, the coating 20 must not only prevent contact between the fuel and the walls 24 and 26, but must also inhibit or prevent the deposition and adhesion of the thermal decomposition products of the fuel. According to this invention, both the composition of the coating 20 and the process by which the coating 20 is deposited must be specifically tailored to achieve the objects of this invention.

A first aspect of this invention is to prepare the walls 24 and 26 to have surfaces that are substantially free of surface irregularities, so as to reduce or eliminate what may be termed a "mechanical" mechanism that would otherwise allow for the deposition and adhesion of decomposition products. According to this invention, suitable wall surfaces are characterized as being substantially free of surface flaws, and with a surface roughness characterized by an $R_{max}$ of up to about 0.4 micrometer (about 16 micro-inches) so as to yield a smooth finish. While various processes are known that can achieve a suitable surface finish for purposes of this invention, a preferred method is an electro-polishing process that both cleans and polishes the surfaces of the walls 24 and 26. Cleaning and polishing are carried out so as to remove oxidation and irregularities on the surfaces of the walls 24 and 26 that might otherwise serve as a mechanical adhesion mechanism for composition products. Notably, the absence of surface irregularities is contrary to prior art methods for promoting adhesion of an oxide coating by etching the surface on which the coating is to be deposited, as taught by U.S. Pat. No. 4,530,340 to Totman.

Also according to this invention, the coating 20 is deposited on the surfaces of the walls 24 and 26 without any adhesion-promoting intermediate layer of the type often provided in the prior art, such as an oxide layer grown in situ on the surface to be coated. Instead, the oxide coating 20 of this invention is deposited directly on, and therefore conforms to, the polished and unoxidized surfaces of the walls 24 and 26, meaning that the oxide atoms of the coating 20 follow the contour of the wall surfaces at a microscopic scale.

To retain the benefits of the surface finish of the walls 24 and 26, the coating 20 preferably has a thickness of not more than one micrometer, such that the coating 20 will not only conform to and cover the surfaces of the walls 24 and 26, but also have a surface roughness that is similar to that of the wall surfaces. One skilled in the art will appreciate that the surface roughness of the walls 24 and 26 and the absence of an adhesion-promoting layer is contrary to the prior art, and would expect the coating 20 to have inferior adhesion characteristics. However, according to this invention, the coating 20 is durable and highly adherent when deposited by a chemical vapor deposition (CVD) process using an organometallic compound precursor without use of a carrier gas, such that the coating 20 consists essentially of the oxide, the balance being vapors of the organometallic compound. Unexpectedly, the resulting high concentration of oxide, diluted only by vapors of the organometallic compound, exhibits excellent adhesion characteristics when subjected to a wide variety of thermally and chemically hostile conditions.

Preferred oxides for the coating of this invention include tantalum oxide ($Ta_2O_5$) and silicon dioxide ($SiO_2$), though it is foreseeable that other oxides or oxide mixtures could be used. According to this invention, these oxides can be applied without preoxidation of the substrate material and without a carrier gas to yield an adherent coating 20 having a thickness of about one micrometer or less. In addition to producing a highly adherent coating 20, the CVD process of this invention is also effective in producing a coating that is continuous and highly conformal. For example, a one micrometer defect in the surface of one of the walls 24 or 26 can be suitably covered with a coating thickness of only 0.5 micrometer. According to this invention, a preferred surface finish for the walls 24 and 26 is characterized by an $R_{max}$ of up to about 0.2 micrometer (about 8 micro-inches), and a preferred coating thickness is about 0.5 micrometer.

In view of the above, it is apparent that the surface condition of the walls 24 and 26, the material for the coating 20 and the manner in which the coating 20 is deposited are specifically tailored to inhibit or prevent the deposition and adhesion of gum, coke, sulfur compounds, or other decomposition impurities or mixtures thereof formed by the thermal decomposition of the hydrocarbon fluid. As such, the present invention solves the problems related to the formation of thermal decomposition products that are chemically associated with hot hydrocarbon fluid and surfaces that contact the fluid. In addition, it can be appreciated that the coating 20 of this invention is also a protective layer for an underlying substrate. As such, the coating 20 serves as a physical barrier to a hot hydrocarbon fluid, so as to protect the underlying substrate from erosion by the fluid and prevent the diffusion of fluid constituents into the underlying substrate.

Although the present invention has utility in any fuel containment article or in any fuel containment system in which fuel does not undergo combustion, it is particularly useful for fuel containment articles and fuel containment systems in which the fuel is used as a heat exchange medium to remove heat, such as the heat exchanger 2 of FIG. 1. As such, this invention can be employed in the fuel systems of gas turbine, scramjet, ramjet or turbojet engines.

Figure 3:
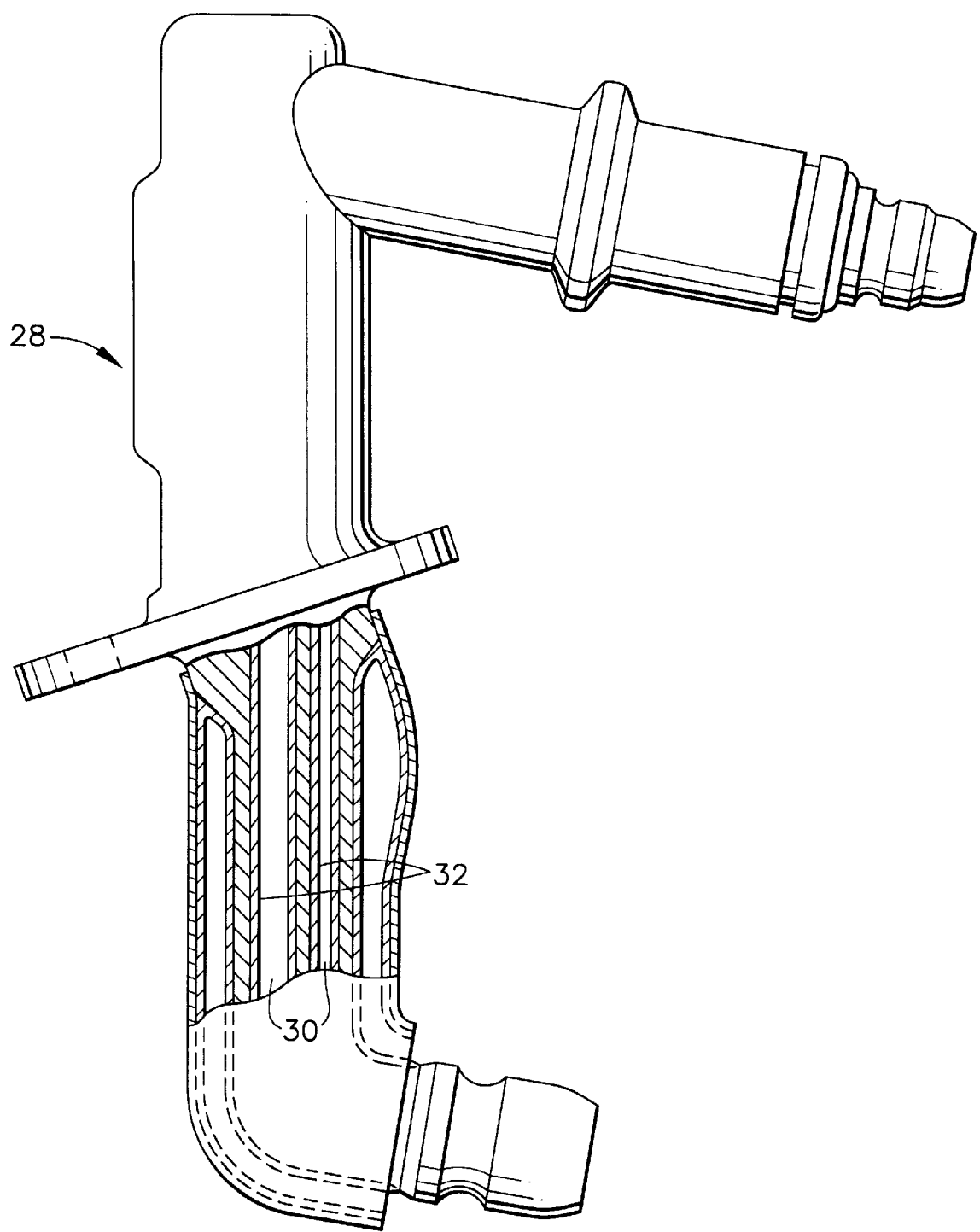
FIG. 3 is a cross-sectional view of a fuel nozzle of a jet engine combustor, and shows fuel-containing passages for delivering a hot hydrocarbon fluid to the combustor for burning.

Furthermore, those skilled in the art will appreciate that the benefits of this invention are applicable to other fuel system components of such engines, including the fuel nozzle 28 represented in FIG. 3. As illustrated, the fuel nozzle 28 is equipped with fluid passages 30 whose walls are covered with a coating 32 in accordance with this invention. Because of the proximity of the nozzle 28 to the combustor of a jet engine, the temperature of the fuel while in contact with coating 32 will often be sufficient for the formation of hydrocarbon thermal decomposition products. This tendency is even more pronounced if the fuel nozzle 28 is downstream of the heat exchanger represented of FIGS. 1 and 2. In accordance with this invention, the coating 32 inhibits the deposition and adhesion of decomposition products, e.g., gum and coke, and therefore prevents such products from plugging the nozzle 28 and its passages 30.

While the invention has been described in terms of a preferred embodiment, it is apparent that other forms could be adopted by one skilled in the art. Accordingly, the scope of our invention is to be limited only by the following claims.

What is claimed is:

1. An article having a surface in contact with a hydrocarbon fluid at a temperature at which the surface is susceptible to gum or coke deposits from the hydrocarbon fluid, the article comprising:

a metallic substrate that forms the surface of the article, the substrate having a surface roughness characterized by an $R_{max}$ of up to about 0.4 micrometer, the surface being otherwise free of flaws; and a conformal coating of an oxide deposited directly on the substrate, the conformal coating having a thickness of not more than one micrometer so as to conform to and cover the surface of the article, the conformal coating being deposited by a chemical vapor deposition such that the coating consists essentially of the oxide.

2. An article as recited in claim 1 wherein the surface of the article has an $R_{max}$ of up to about 0.2 micrometer and the conformal coating has a thickness of about 0.5 micrometer.

3. An article as recited in claim 1 wherein the oxide is tantalum oxide or silicon dioxide.

4. An article as recited in claim 1 wherein the article is a heat exchanger.

5. An article as recited in claim 1 wherein the article is a fuel nozzle.

\* \* \* \* \*